United States Patent
Sugimoto

(10) Patent No.: US 6,837,254 B2
(45) Date of Patent: Jan. 4, 2005

(54) SYSTEM FOR CLEANING DRAINAGE PIPES IN MOVABLE EQUIPMENT

(75) Inventor: Takeshi Sugimoto, Habikino (JP)

(73) Assignee: Seiwa Pro Co., Ltd., Matsubara (JP)

( * ) Notice: Subject to any disclaimer, the term of this patent is extended or adjusted under 35 U.S.C. 154(b) by 312 days.

(21) Appl. No.: 10/220,287

(22) PCT Filed: Sep. 6, 2001

(86) PCT No.: PCT/JP01/07756

§ 371 (c)(1),
(2), (4) Date: Sep. 10, 2002

(87) PCT Pub. No.: WO03/022467

PCT Pub. Date: Mar. 20, 2003

(65) Prior Publication Data

US 2003/0172963 A1 Sep. 18, 2003

(51) Int. Cl.[7] .......................... B08B 9/027; B08B 9/032
(52) U.S. Cl. .............................. 134/169 C; 134/166 R; 134/104.4; 134/109; 134/169 R
(58) Field of Search ...................... 134/169 R, 169 C, 134/166 C, 109, 104.4; 118/DIG. 10; 427/238, 239

(56) References Cited

U.S. PATENT DOCUMENTS 5,873,944 A * 2/1999 Lien et al. ..................... 134/10
6,001,189 A * 12/1999 Rolfson ......................... 134/10
6,484,736 B1 * 11/2002 Kanda et al. ................ 134/109
6,533,871 B2 * 3/2003 Zahuranec et al. ........... 134/21

FOREIGN PATENT DOCUMENTS

| JP | 6-58435 | 8/1994 |
| JP | 2717627 | 11/1997 |
| JP | 11-285675 | 10/1999 |

* cited by examiner

Primary Examiner—Michael Barr
Assistant Examiner—Andrew McAleavey
(74) Attorney, Agent, or Firm—Westerman, Hattori, Daniels & Adrian, LLP

(57) ABSTRACT

A system is provided which is capable of cleaning a drainage pipe in a short time for removal of scale without detaching the drainage pipe from movable equipment. The system comprises: a reservoir tank containing a cleaning liquid; a feed pipe connecting the reservoir tank and a downstream side of the drainage pipe of the movable equipment and including feed pump means for feeding the cleaning liquid to the downstream side of the drainage pipe from the reservoir tank; a suction pipe connecting an upstream side of the drainage pipe and the reservoir tank; and vacuum pump means for sucking gas from the reservoir tank; wherein the suction pipe is provided with gas separation means for separating gas from gas, liquid and solid sucked from the drainage pipe; wherein a gas suction pipe for feeding the separated gas back into the reservoir tank is connected parallel to the suction pipe between the gas separation means and the reservoir tank.

7 Claims, 2 Drawing Sheets

SYSTEM FOR CLEANING DRAINAGE PIPES IN MOVABLE EQUIPMENT

TECHNICAL FIELD

The present invention relates to a system for cleaning a pipe provided in movable equipment such as a passenger plane and, more specifically, to a system for removing scale deposited within drainage pipes of a sink and a toilet in a lavatory.

BACKGROUND ART

In movable equipments such as passenger planes, drainage pipes are installed for a sink and a toilet in a lavatory. During use of the drainage pipes, calcium compounds and organic compounds are deposited in the drainage pipes (the deposit is hereinafter referred to as "scale"). Since the scale thus deposited may cause the reduction of the draining capacity, the clogging of the pipes and an offensive smell, the scale should periodically be removed.

A conventional method for the removal of the scale is such that the drainage pipes are detached from the movable equipment, transported to a site equipped with a special cleaning apparatus for cleaning the drainage pipes, transported back to the movable equipment after completion of the cleaning, and attached to the movable equipment.

The movable equipment has a complicated inner structure, and the drainage pipes are bent in various directions. Therefore, the drainage pipe detaching and attaching operations are very difficult, requiring enormous amounts of time, efforts and costs. For this reason, a drainage pipe cleaning operation is performed only in a regular maintenance operation. Since the scale is gradually deposited in the drainage pipes, reduction in draining capacity and sudden clogging of the drainage pipes may occur before the next regular maintenance operation.

Accordingly, there is a great demand for development of a system for cleaning a drainage pipe in a short time without detaching the drainage pipe.

It is an object of the present invention to provide a system for cleaning a drainage pipe in a short time for removal of scale without detaching the drainage pipe from movable equipment.

DISCLOSURE OF THE INVENTION

To solve the aforesaid problem, a system for cleaning a drainage pipe in a movable equipment in accordance with the present invention comprises: a reservoir tank containing a cleaning liquid; a feed pipe connecting the reservoir tank and a downstream side of the drainage pipe of the movable equipment and including feed pump means for feeding the cleaning liquid to the downstream side of the drainage pipe from the reservoir tank; a suction pipe connecting an upstream side of the drainage pipe and the reservoir tank; and vacuum pump means for sucking gas from the reservoir tank; wherein the suction pipe is provided with gas separation means for separating gas from gas, liquid and solid sucked from the drainage pipe; wherein a gas suction pipe for feeding the separated gas back into the reservoir tank is connected parallel to the suction pipe between the gas separation means and the reservoir tank.

In the system for cleaning the drainage pipe in the movable equipment, the feed pump means and the vacuum pump means are actuated to maintain the inside of the drainage pipe at a negative pressure, to feed the cleaning liquid into the drainage pipe from the reservoir tank through the feed pipe, and to cause the cleaning liquid to flow toward the upstream side of the drainage pipe, whereby scale deposited in the drainage pipe is removed and the removed scale is sucked together with the cleaning liquid through the suction pipe. After only the gas is separated from the gas, the liquid and the solid sucked into the suction pipe by the gas separation means, the liquid and the solid are fed back into the reservoir tank through the suction pipe, and the gas is fed back into the reservoir tank through the gas suction pipe.

Since the inside of the drainage pipe is maintained at a negative pressure, the cleaning liquid and the like do not leak out of the drainage pipe. Further, the cleaning liquid is caused to flow in a direction opposite to a normal water draining direction in the drainage pipe, i.e., from the downstream side to the upstream side of the drainage pipe. Thus, energy is applied to the scale in a direction opposite to a scale growing direction so as to promote the removal of the scale. Therefore, scale removing and cleaning effects can be enhanced.

Since the gas is separated from the liquid and the solid in the suction pipe by the gas separation means, the gas does not flow back in the form of bubbles nor hinder the flow of the liquid and the solid in the suction pipe.

The system for cleaning the drainage pipe in the movable equipment in accordance with the present invention may further comprise a feed-back pipe diverged from the feed pipe on a downstream side of the feed pump means and connected to the reservoir tank, wherein the feed-back pipe is provided with a feed-back valve device for maintaining a pressure of the cleaning liquid fed into the drainage pipe through the feed pipe at a substantially constant level and, when the pressure of the cleaning liquid exceeds a predetermined level, feeding a part or all of the cleaning liquid back into the reservoir tank.

According to the system for cleaning the drainage pipe in the movable equipment, the feed-back valve device is opened to feed the part or all of the cleaning liquid back into the reservoir tank from the feed-back pipe when the pressure of the cleaning liquid fed into the drainage pipe from the feed pipe exceeds the predetermined level. Therefore, the cleaning liquid does not flow into the drainage pipe at a pressure greater than the predetermined level.

The system for cleaning the drainage pipe in the movable equipment in accordance with the present invention preferably further comprises outside air introduction valve means provided in the gas suction pipe for introducing outside air to a downstream side of the gas separation means, and gas introduction preventing valve means provided on a downstream side of the outside air introduction valve means for closing the gas suction pipe for prevention of introduction of the gas into the reservoir tank, wherein the outside air introduction valve means is closed and the introduction preventing valve means is opened during a normal operation and, when an inner pressure of the drainage pipe exceeds a predetermined level, the outside air introduction valve means is opened and the introduction preventing valve means is closed for adjustment of the inner pressure of the drainage pipe.

According to the system for cleaning the drainage pipe in the movable equipment, the outside air introduction valve means is opened and the introduction preventing valve means is closed when the inner pressure of the drainage pipe exceeds the predetermined level due to bad flow of the cleaning liquid in the drainage pipe or clogging of the drainage pipe. Thus, the outside air sucked through the outside air introduction valve means is introduced into the drainage pipe without flowing into the reservoir tank from the gas suction pipe. Therefore, the inner pressure of the drainage pipe is maintained at the atmospheric pressure, so that the cleaning liquid and the like do not scatter out of the drainage pipe.

In the system for cleaning the drainage pipe in the movable equipment in accordance with the present invention, solid separation means for separating the solid is preferably connected parallel to the suction pipe between the gas separation means and the reservoir tank.

Since the system for cleaning the drainage pipe in the movable equipment includes the solid separation means, the solid component is separated from the cleaning liquid as required during the cleaning and only the liquid component is fed back into the reservoir tank.

In the system for cleaning the drainage pipe in the movable equipment in accordance with the present invention, the cleaning liquid preferably contains solid chips.

When the solid chips contained in the cleaning liquid bump against organic compounds and the like in the scale, the organic compounds and anaerobic bacteria in the drainage pipe can be removed.

In the system for cleaning the drainage pipe in the movable equipment in accordance with the present invention, the cleaning liquid preferably contains at least one oxycarboxylic acid and at least one sulfamic acid.

The cleaning liquid containing the at least one oxycarboxylic acid and the at least one sulfamic acid is particularly advantageous for dissolving calcium compounds in the scale for removal thereof.

A vehicle according to the present invention is mounted with the aforesaid system for cleaning the drainage pipe in the movable equipment.

Since the system for cleaning the drainage pipe in the movable equipment is mounted on the vehicle, the vehicle is moved to a site where the movable equipment is parked for cleaning the drainage pipe. This obviates the need for moving the movable equipment to a predetermined site for cleaning the drainage pipe of the movable equipment.

BEST MODE FOR CARRYING OUT THE INVENTION

Examples of the movable equipment in which the drainage pipe to be cleaned is installed include passenger planes, rail-road coaches, buses and ships.

Figure 1:
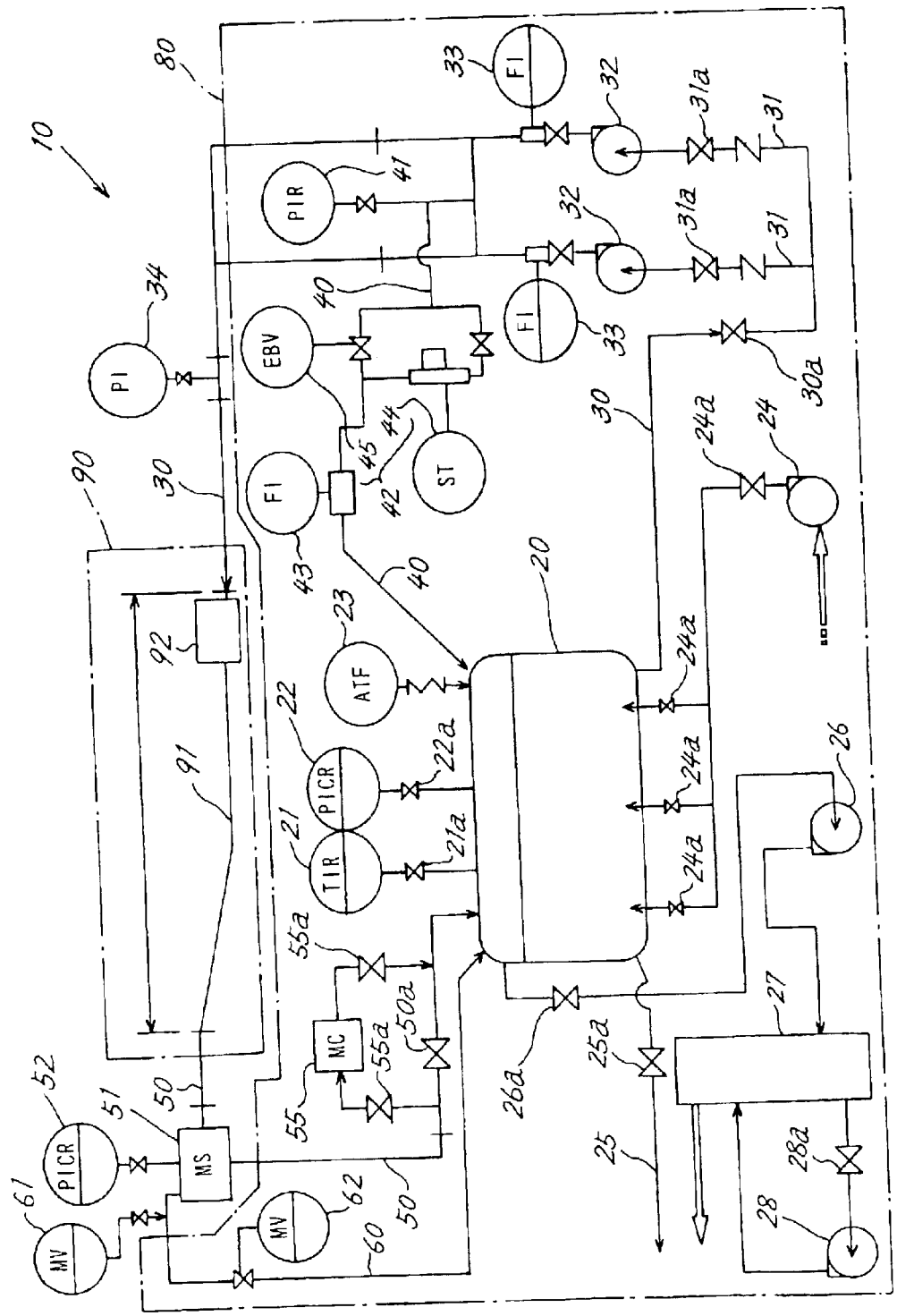
FIG. 1 is an explanatory diagram illustrating the construction of a cleaning system according to the present invention.

As shown in FIG. 1, a drainage pipe 91 is installed in movable equipment 90. The drainage pipe 91 includes a plurality of drainage pipes each having an upstream end connected to a sink or a toilet in a lavatory, and a downstream end connected to a common sewage tank 92.

FIG. 1 illustrates the overall construction of a cleaning system 10. As shown, the cleaning system 10 is constructed so that a reservoir tank 20 containing a cleaning liquid L is connected to the drainage pipe 91 of the movable equipment 90 by a feed pipe 30 and a suction pipe 50.

The reservoir tank 20 may be mounted on a vehicle 80 such as a truck. The feed pipe 30 for feeding the cleaning liquid L into the drainage pipe 91 of the movable equipment 90 is connected to the reservoir tank 20 at a position lower than the surface level of the cleaning liquid L. A feed-back pipe 40 to be described later, the suction pipe 50, and a gas suction pipe 60 are connected to the reservoir tank 20 at positions upper than the surface level of the cleaning liquid L. Further, the reservoir tank 20 is provided with a thermometer 21 and a pressure gauge 22 for measuring the inner temperature and pressure of the reservoir tank with the intervention of valves 21a and 22a, respectively. The reservoir tank 20 is further connected to an air transformer 23 for supplying outside air into the reservoir tank when a toxic gas or a combustible gas is generated by the cleaning. The reservoir tank 20 is further connected to a blower 24 for agitating the cleaning liquid L in the reservoir tank 20 and to a blow down pipe 25 for draining the cleaning agent L from the dissolution tank via valves 24a and 25a, respectively.

The cleaning liquid L to be contained in the reservoir tank 20 may properly be selected depending on the components and amount of the scale deposited in the drainage pipe 91 of the movable equipment 90 and the configuration of the drainage pipe 91. In the case of a passenger plane, for example, the scale deposited in the drainage pipe is mainly composed of calcium compounds, organic compounds and anaerobic bacteria. For removal of the calcium compounds in the scale, a cleaning liquid containing at least one oxycarboxylic acid and at least one sulfamic acid is preferably employed. The organic compounds and the anaerobic bacteria are often deposited in a slime form on the calcium compounds. Therefore, solid chips are mixed in the cleaning liquid L for scraping away the deposited organic compounds and the like. Examples of the solid chips mixed in the cleaning liquid include rice husks and silicone granules.

The feed pipe 30 for feeding the cleaning liquid L into the drainage pipe 91 is connected to a downstream side of the drainage pipe 91 of the movable equipment 90. The feed pipe 30 may be connected to the sewage tank 92 of the movable equipment 90 as shown in the figure.

The feed pipe 30 is branched into two branch feed pipes 31, 31 downstream of a valve 30a, and the branch feed pipes 31, 31 are respectively provided with feed pump means 32, 32 with the intervention of valves 31a, 31a. Flow meters 33, 33 are provided downstream of the feed pump means 32, 32 for monitoring the flow rates of the cleaning liquid L fed into the drainage pipe 91 from the feed pump means 32, 32. Since the feed pipe 30 is branched and the two feed pump means 32, 32 are provided, the pump head capacity of each of the feed pump means can be reduced and the supply amount can be stabilized. Even if one of the pump means is broken, the cleaning liquid L can be fed by driving the other pump means.

The feed-back pipe 40 is connected to the branch feed pipes 31, 31 downstream of the flow meters 33, 33. The feed-back pipe 40 will be described later.

The branch feed pipes 32, 32 join together downstream of a branch point at which the feed-back pipe 40 is diverged therefrom. An end of the joined feed pipe 30 is connected to the drainage pipe 91 of the movable equipment 90 via a pressure indicator 34.

The feed-back pipe 40 is a pipe for feeding a part or all of the cleaning liquid L back into the reservoir tank 20 from the branch feed pipes 31, 31. The feed-back pipe 40 is branched into two branches and joined together. A pressure gauge 41 is provided upstream of a branch point, and feed-back valve means 42 is provided in the branches. A flow meter 43 is provided downstream of a junction of the branches.

The feed-back valve means 42 includes a solution pressure adjustment feed-back valve 44 provided in one of the branches and an emergency feed-back valve 45 provided in the other branch. The solution pressure adjustment feed-back valve 44 feeds apart of the cleaning liquid L flowing through the branch feed pipes 31, 31 into the reservoir tank 20 according to measurements taken by the pressure gauge 41 and the flow meters 33, 33 provided in the feed pipe 30, thereby serving to maintain the pressure and flow rate of the cleaning liquid L fed into the drainage pipe 91 from the feed pipe 30 at constant levels. The emergency feed-back valve 45 is opened to prevent the cleaning liquid L from flowing into the drainage pipe 91 from the feed pipe 30 when any of the pressure gauges provided in the cleaning system 10 indicates a pressure higher than a predetermined level.

One end of the suction pipe 50 is connected to an upstream side of the drainage pipe 91 of the movable equipment 90, i.e., to the side of the sink and the toilet, and the other end of the suction pipe 50 is connected to the reservoir tank 20.

The cleaning liquid L discharged from the drainage pipe 91, the scale and a gas component in the drainage pipe and the like are sucked as fluid effluent through the suction pipe 50.

Gas separation means 51 is provided in the suction pipe 50, whereby the gas component is separated from the effluent and fed back into the reservoir tank 20 through the gas suction pipe 60, and the liquid and solid components are fed back into the reservoir tank 20 through the suction pipe 50. The gas separation means 51 is provided with a measurement instrument 52 for detecting, adjusting and recording a pressure.

Figure 2:
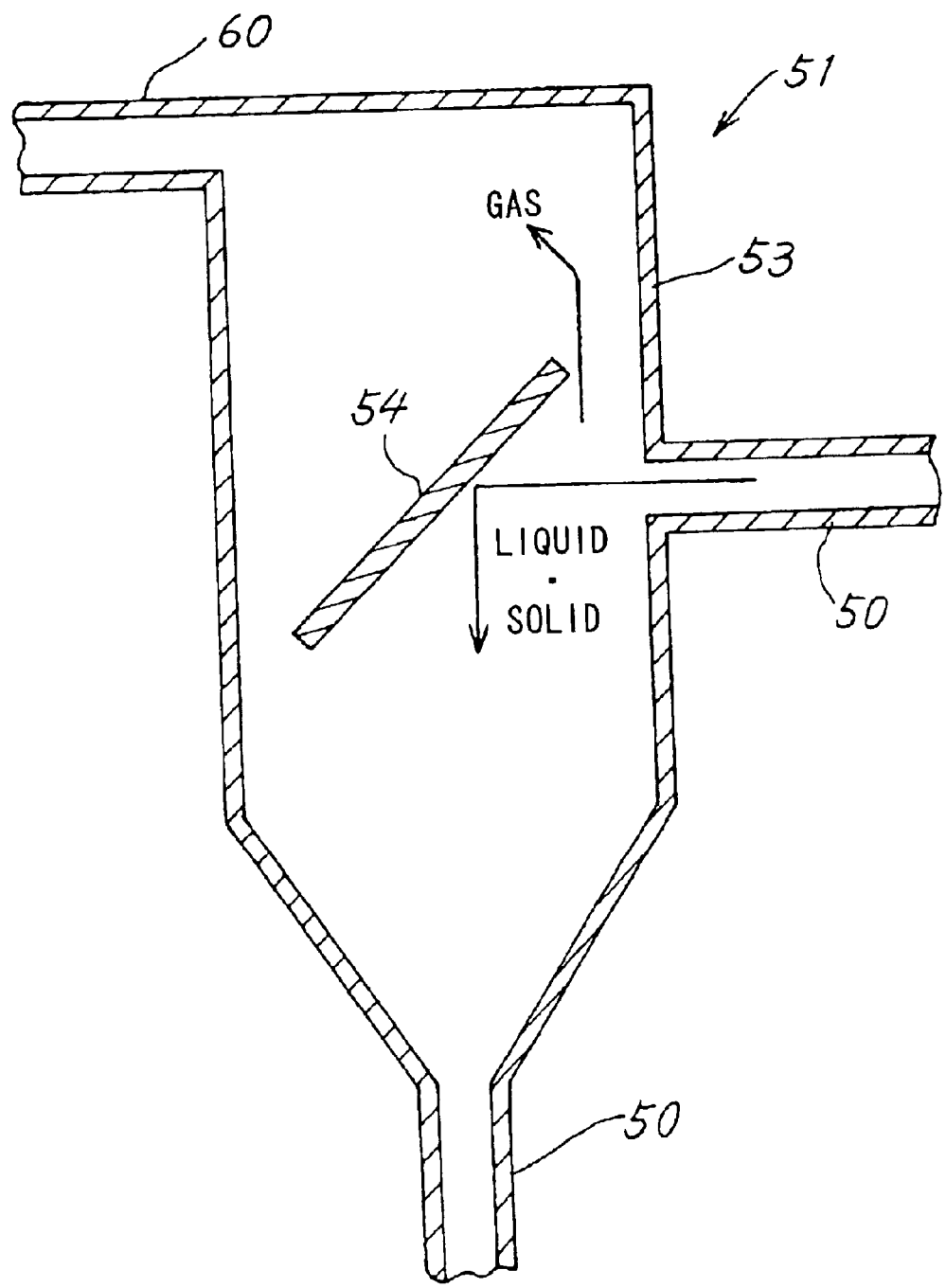
FIG. 2 is a sectional view of gas separation means.

For example, a device which includes a cylindrical vessel 53 having a smaller-diameter lower end and a baffle plate 54 provided diagonally downward in a generally central portion of the vessel 53 as shown in FIG. 2 may be employed as the gas separation means 51. In this device, the effluent sucked from the drainage pipe 91 of the movable equipment 90 is thrown against the baffle plate 54, whereby the gas component flows upward and the liquid and solid components flow downward by gravity for separation of the gas component from the liquid and solid components. The separated gas component is fed back into the reservoir tank 20 through the gas suction pipe 60 connected to an upper portion of the vessel 53. The liquid and solid components are fed back into the reservoir tank 20 through the suction pipe 50 connected to a lower end of the cylindrical vessel 53.

Outside air introduction valve means 61 and gas introduction preventing valve means 62 are provided in this order downstream of the gas separation means 51 in the gas suction pipe 60. These valve means 61, 62 introduce the outside air into the drainage pipe 91 to restore the inner pressure of the drainage pipe 91 to the atmospheric pressure when the inner pressure of the drainage pipe 91 exceeds a predetermined level, whereby the inner pressure of the drainage pipe 91 is prevented from increasing to a high level. The outside air introduction valve means 61 is a valve for introducing the outside air into the drainage pipe 91 through the suction pipe 50 from the gas suction pipe 60. This valve is closed during a normal operation, and is opened when the pressure in the drainage pipe 91 exceeds the predetermined level. On the other hand, the gas introduction preventing valve 62 closes the gas suction pipe 60 so as to allow the outside air introduced from the outside air introduction valve means 61 to flow into the drainage pipe 91 without flowing into the reservoir tank 20 from the gas suction pipe 60 when the outside air introduction valve means 61 is opened, and is opened during the normal operation.

In the suction pipe 50, a valve 50a is provided downstream of the gas separation means 51, and solid separation means 55 is provided parallel to the valve 50a.

The solid separation means 55 separates the solid component from the liquid and solid components separated by the gas separation means 51, and only the liquid component is fed back into the suction pipe 50. Valves 55a, 55a are respectively provided on upstream and downstream sides of the solid separation means 55. A filter, for example, may be employed as the solid separation means 55.

When the valves 55a, 55a are opened and the valve 50a is closed, the fluid flowing through the suction pipe 50 flows into the solid separation means 55 and, after the solid component is separated, only the liquid component flows into the reservoir tank 20. When the valves 55a, 55a are closed and the valve 50a is opened, the fluid flowing through the suction pipe 50 is introduced into the reservoir tank 20 without flowing through the solid separation means 55.

Vacuum pump means 26 is connected to the reservoir tank 20 via a valve 26a. The vacuum pump means 26 sucks gas from the reservoir tank 20 to maintain the inside of the reservoir tank 20 at a negative pressure.

A deodorization tower 27 for deodorizing the sucked gas is connected to a downstream side of the vacuum pump means 26. A pump 28 for circulating a deodorant is connected to the deodorization tower 27 via a valve 28a. The gas sucked from the vacuum pump means 26 passes through the deodorization tower 27 thereby to be deodorized, and emitted to the outside.

The pump means, the valves and the like described above are electrically connected to each other for actuation thereof or opening and closing thereof on the basis of measurements taken by the thermometers, the pressure gauges and the flow meters.

The cleaning system 10 is mounted on a deck of a vehicle such as a truck, and transported to a site where the movable equipment having the drainage pipe to be cleaned is parked for cleaning the drainage pipe.

An explanation will be given to how to clean the drainage pipe 91 of the movable equipment 90 by utilizing the vehicle 80 mounted with the cleaning system 10 having the aforesaid construction.

A cleaning liquid L containing L-malic acid and citric acid as the oxycarboxylic acid and amidosulfonic acid as the sulfamic acid and containing rice husks as the solid chips is filled into the reservoir tank 20, and the blower 24 is actuated to agitate the cleaning liquid L.

The vehicle mounted with the cleaning system 10 is moved to the vicinity of the movable equipment 90. After sewage accumulated in the drainage pipe 91 and the sewage tank 92 of the movable equipment is discharged, an end of the feed pipe 30 is connected to the drainage pipe 91 (or the sewage tank 92), and an end of the suction pipe 50 is connected to the upstream end of the drainage pipe 91.

After completion of the pipe connection, the feed pump means 32, the vacuum pump means 26 and the air transformer 23 are actuated.

By the actuation of the feed pump means 32 and the vacuum pump means 26, the cleaning liquid L is fed into the drainage pipe 91 from the feed pipe 30.

At this time, the pressure adjustment feed-back valve 44 of the feed-back valve means 42 adjusts a ratio of valve opening according to measurements taken by the flow meters 43, 43 and the pressure gauge 41.

The drainage pipe 91 is filled with the cleaning liquid L by suction to a negative pressure by the vacuum pump means 26. Thus, deposited organic compounds and anaerobic bacteria are gradually scraped away by the solid chips in the cleaning liquid L. Further, calcium compounds are gradually dissolved by the oxycarboxylic acid and the sulfamic acid in the cleaning liquid L.

The cleaning liquid L flows into the suction pipe 50 from the drainage pipe 91. At this time, gas in the drainage pipe 91 is discharged together with the cleaning liquid L into the suction pipe 50. When the cleaning liquid L is sucked together with the gas from the suction pipe 50, the gas is liable to flow back in the form of bubbles through the suction pipe 50, resulting in bad flow. Therefore, the gas component is separate by the gas separation means 51, and fed back into the reservoir tank 20 through the gas suction pipe 60. The cleaning liquid L from which the gas is separated is fed back into the reservoir tank 20 through the suction pipe 50.

In the case of the passenger plane, the cleaning liquid L flows around the cleaning system 10 in about two to three minutes. Since the organic compounds and the anaerobic bacteria in the scale are mostly removed by continuing the cleaning for about 20 minutes, the solid chips are thereafter unnecessary. Therefore, the valves 55a, 55a are opened and the valve 50a is closed to remove the solid component from the cleaning liquid L by the solid separation means 55. Thus, only the liquid component is fed back into the reservoir tank 20.

Thereafter, the cleaning is continued for about one hour, whereby the calcium compounds in the drainage pipe 91 are completely removed. After the scale in the drainage pipe 91 is completely removed, the feed pump means 32 and the vacuum pump means 26 are stopped, and the cleaning liquid L remaining in the drainage pipe 91 and the sewage tank 92 are removed. Thus, the cleaning operation is completed.

When measurements taken by the pressure gauges 22, 34, 41, 52, the flow meters 33, 43 and the thermometer 21 are out of the predetermined levels during the cleaning, an abnormality occurs in the cleaning system 10 or the drainage pipe 91. In such a case, the inner pressure of the drainage pipe 91 increases to a high level, resulting in leakage of the cleaning liquid L from the drainage pipe 91. Therefore, the emergency feed-back valve 45 of the feed-back pipe 40 is opened, whereby the cleaning liquid L in the feed pipe 30 is fed back into the reservoir tank 20 through the feed-back pipe 40. Thus, the cleaning liquid L is prevented from flowing into the drainage pipe 91 to prevent the inner pressure of the drainage pipe 91 from increasing to a high level.

Further, the outside air introduction valve means 61 of the gas suction pipe 60 is opened and the gas introduction preventing valve 62 is closed to introduce the outside air into the drainage pipe 91 from the outside air introduction valve means 61 through the gas discharge pipe 60. Thus, the inner pressure of the gas discharge pipe 91 is not increased higher than the atmospheric pressure.

INDUSTRIAL APPLICABILITY

The system for cleaning the drainage pipe in the movable equipment in accordance with the present invention is useful as a system which is capable of cleaning the drainage pipe in a short time for removal of the scale without detaching the drainage pipe from the movable equipment.

What is claimed is:

1. A system for cleaning a drainage pipe provided in movable equipment comprising:
    a reservoir tank containing a cleaning liquid;
    a feed pipe connecting the reservoir tank and a downstream side of the drainage pipe of the movable equipment and including feed pump means for feeding the cleaning liquid to the downstream side of the drainage pipe from the reservoir tank;
    a suction pipe connecting an upstream side of the drainage pipe and the reservoir tank; and
    vacuum pump means for sucking gas from the reservoir tank;
    wherein the suction pipe is provided with gas separation means for separating gas from gas, liquid and solid sucked from the drainage pipe;
    wherein a gas suction pipe for feeding the separated gas back into the reservoir tank is connected parallel to the suction pipe between the gas separation means and the reservoir tank;
    wherein the feed pump means and the vacuum pump means are actuated to maintain the inside of the drainage pipe at a negative pressure, to feed the cleaning liquid into the drainage pipe from the reservoir tank through the feed pipe, and to cause the cleaning liquid to flow toward the upstream side of the drainage pipe, whereby scale deposited in the drainage pipe is removed and the removed scale is sucked together with the cleaning liquid through the suction pipe and, after only the gas is separated from the gas, the liquid and the solid by the gas separation means, the liquid and the solid are fed back into the reservoir tank through the suction pipe, and the gas is fed back into the reservoir tank through the gas suction pipe.

2. The system for cleaning the drainage pipe in the movable equipment according to claim 1, further comprising:
    a feed-back pipe diverged from the feed pipe on a downstream side of the feed pump means and connected to the reservoir tank;
    wherein the feed-back pipe is provided with a feed-back valve device for maintaining a pressure of the cleaning liquid fed into the drainage pipe through the feed pipe at a substantially constant level and, when the pressure of the cleaning liquid exceeds a predetermined level, feeding a part or all of the cleaning liquid back into the reservoir tank.

3. The system for cleaning the drainage pipe in the movable equipment according to claim 1 or 2, further comprising:
    outside air introduction valve means provided in the gas suction pipe for introducing outside air to a downstream side of the gas separation means; and
    gas introduction preventing valve means provided on a downstream side of the outside air introduction valve means for closing the gas suction pipe for prevention of introduction of the gas into the reservoir tank;
    wherein the outside air introduction valve means is closed and the introduction preventing valve means is opened during a normal operation and, when an inner pressure of the drainage pipe exceeds a predetermined level, the outside air introduction valve means is opened and the introduction preventing valve means is closed for adjustment of the inner pressure of the drainage pipe.

4. The system for cleaning the drainage pipe in the movable equipment according to claim 1 or 2, wherein solid separation means for separating the solid is connected parallel to the suction pipe between the gas separation means and the reservoir tank.

5. The system for cleaning the drainage pipe in the movable equipment according to claim 1 or 2, wherein the cleaning liquid contains solid chips.

6. The system for cleaning the drainage pipe in the movable equipment according to claim 1 or 2, wherein the cleaning liquid contains at least one oxycarboxylic acid and at least one sulfamic acid.

7. A vehicle mounted with the system for cleaning the drainage pipe in the movable equipment according to claim 1 or 2.

* * * * *